(12) United States Patent
Tanielian

(10) Patent No.: US 8,872,094 B2
(45) Date of Patent: Oct. 28, 2014

(54) MICROPLASMA NIGHT VISION DEVICE

(75) Inventor: Minas Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 13/558,012

(22) Filed: Jul. 25, 2012

(65) Prior Publication Data
US 2014/0027622 A1   Jan. 30, 2014

(51) Int. Cl.
*H01J 47/02*   (2006.01)

(52) U.S. Cl.
USPC .............. 250/214 VT; 313/538; 313/542

(58) Field of Classification Search
USPC .................. 250/214 VT; 313/538, 542
See application file for complete search history.

(56) References Cited

U.S. PATENT DOCUMENTS 3,213,312 A * 10/1965 Crowe et al. ............ 313/539
5,311,010 A *  5/1994 Kruger ................. 250/214 VT
6,828,730 B2 * 12/2004 Eden et al. ............. 313/538

OTHER PUBLICATIONS

Park et al., "Photodetection in the visible, ultraviolet, and near-infrared with silicon microdischarge devices," *Appl. Phys. Lett.*, vol. 81, No. 24 (2002).
Ostrom et al., "Microcavity plasma photodetectors: Photosensitivity, dynamic range, and the plasma-semiconductor interface," *Appl. Phys. Lett.*, 87, 141101 (2005).

* cited by examiner

*Primary Examiner* — Tony Ko
(74) *Attorney, Agent, or Firm* — Walters & Wasylyna LLC

(57) ABSTRACT

A photon sensing and amplification device including a photocathode, a transparent electrode opposed from the photocathode, and a plasma chamber positioned between the photocathode and the transparent electrode, wherein the plasma chamber houses an ionizable gas.

18 Claims, 3 Drawing Sheets

MICROPLASMA NIGHT VISION DEVICE

FIELD

This application relates to light sensing and amplification and, more particularly, to night vision apparatus and methods.

BACKGROUND

Night vision imaging is currently achieved by collecting and amplifying light. In one approach, ambient visible light (e.g., moonlight, starlight, plant luminescence and the like) is collected, converted to electrons, amplified and then converted to a visible image. In another approach, commonly referred to as thermal imaging, infrared photons emitted by an object that is warmer than the ambient environment (e.g., a living organism or a vehicle engine) are captured, such as with a charge-coupled device image sensor, and the image is then processed, amplified, and then displayed as a visible image.

A typical ambient light-collecting night vision device includes an objective lens that collects light that may not be readily visible with the naked eye, and focuses the collected light onto an image intensifier. The image intensifier includes a photocathode that absorbs the collected light and converts it to electrons. A microchannel plate is often used to further amplify the electronic signal. The amplified electronic signal is then drawn toward, and strikes, a phosphor screen, thereby causing the screen to emit visible light. Since the phosphor screen emits visible light in exactly the same pattern and contrast as collected by the objective lens, an image is created on the phosphor screen that closely corresponds to the scene observed by the objective lens. The green image formed on the phosphor screen has become characteristic of night vision devices.

Advances in night vision technology have brought about significant improvements in amplification. For example, so-called "Gen III" night vision devices have electron amplification ratios ranging from 30,000 to 50,000 and photon amplification ratios (i.e., photons out divided by photons in) of about 20 to 25. However, such night vision devices are relatively expensive and do not readily scale into large formats.

Accordingly, those skilled in the art continue with research and development efforts in the field of night vision.

SUMMARY

In one embodiment, the disclosed photon sensing device may include a photocathode, a transparent electrode opposed from the photocathode, and a plasma chamber positioned between the photocathode and the transparent electrode, wherein the plasma chamber houses an ionizable gas.

In another embodiment, the disclosed photon sensing device may include a photocathode, a transparent electrode opposed from the photocathode, a plasma chamber positioned between the photocathode and the transparent electrode, wherein the plasma chamber houses an ionizable gas, and a voltage source, wherein the voltage source applies a voltage across the plasma chamber. The applied voltage may be less than a threshold voltage required to ionize the ionizable gas.

In another embodiment, the disclosed photon sensing device may include a photocathode, a transparent electrode opposed from the photocathode, a plurality of plasma chambers arranged in parallel between the photocathode and the transparent electrode, wherein each plasma chamber houses an ionizable gas, and a voltage source that applies a voltage across the plasma chambers. The applied voltage may be less than a threshold voltage required to ionize the ionizable gas within the plasma chambers.

In yet another embodiment, also disclosed is a method for sensing incident photons. The method may include the steps of (1) providing a plasma cavity housing an ionizable gas, (2) applying a voltage across the plasma cavity, the applied voltage being less than a threshold voltage required to ionize the ionizable gas, (3) transducing the incident photons to electrons, and (4) introducing the electrons to the plasma cavity.

Other embodiments of the disclosed microplasma night vision device and method will become apparent from the following detailed description, the accompanying drawings and the appended claims.

DETAILED DESCRIPTION

Disclosed are various photon sensing and amplifying devices and methods. While the disclosed photon sensing devices and methods are presented in the night vision and thermal imaging context (e.g., for use in goggles), various alternative applications, such as imaging, analysis and radiation detection, are also contemplated and will not result in a departure from the scope of the present disclosure.

Figure 1:
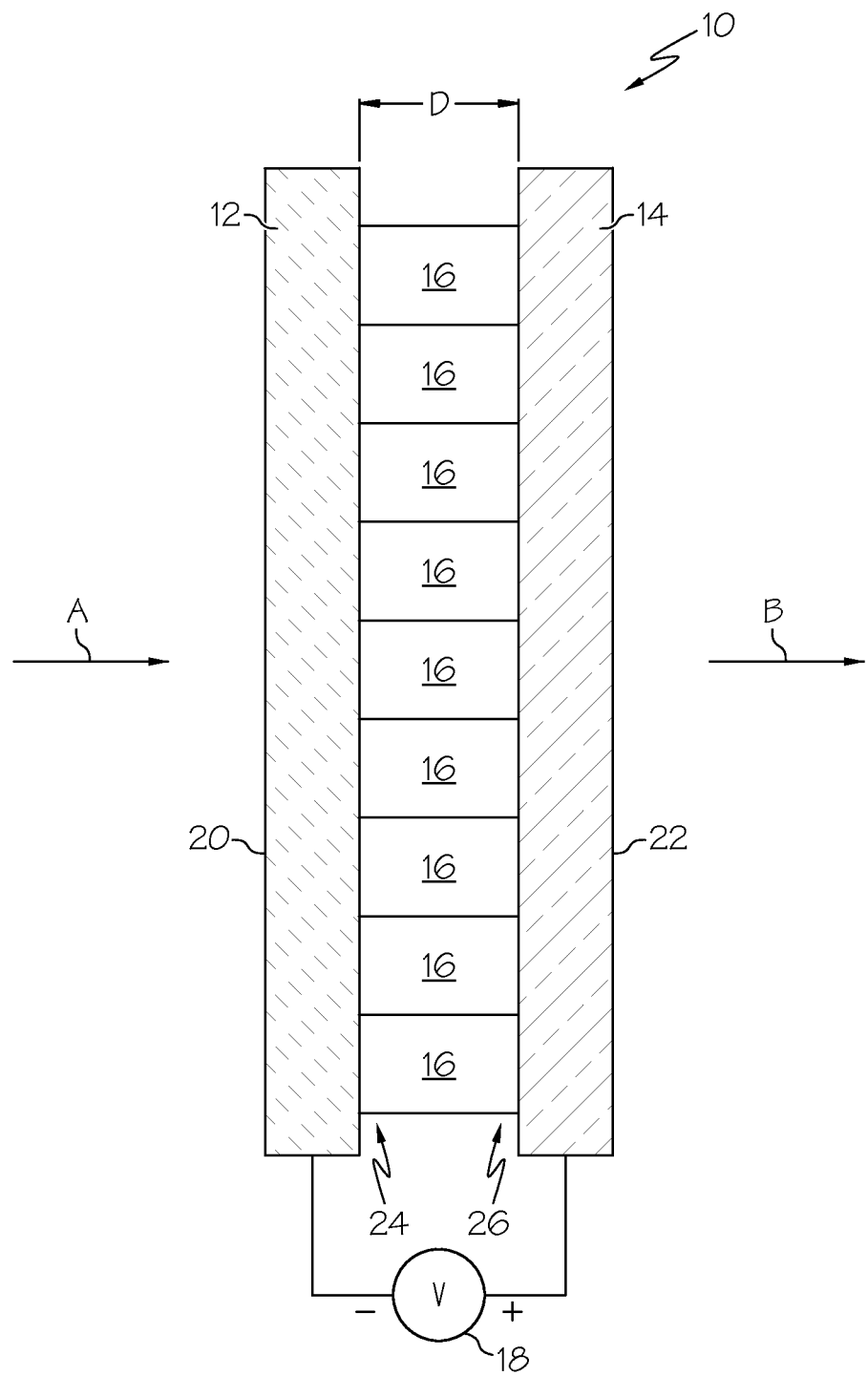
FIG. 1 is a schematic side elevational view, in section, of one embodiment of the disclosed microplasma night vision device.

Referring to FIG. 1, one embodiment of the disclosed microplasma night vision device, generally designated 10, may include a photocathode 12, a transparent electrode 14 and a plurality of plasma cavities 16 positioned between the photocathode 12 and the transparent electrode 14. A voltage source 18 may apply a voltage V across the photocathode 12 and the transparent electrode 14.

The photocathode 12 may be any material or structure that emits electrons in response to incident electromagnetic radiation (arrow A) pursuant to the photoelectric effect and/or any material or structure that generates free electrons due to the photovoltaic effect. In one particular construction, the photocathode 12 may emit/generate electrons in response to incident visible light. In another particular construction, the photocathode 12 may emit/generate electrons in response to incident infrared light. In yet another particular construction, the photocathode 12 may emit/generate electrons in response to both visible and infrared light. Therefore, the photocathode 12 may act as the electron source of the disclosed microplasma night vision device 10.

The photocathode 12 may include a semiconductor material. In one variation, the semiconductor material used in (or as) the photocathode 12 may include a p-n junction. In another variation, the semiconductor material used in (or as) the photocathode 12 may include an intrinsic region between a p-type semiconductor and an n-type semiconductor. In yet another variation, the semiconductor material used in (or as) the photocathode 12 may be a III-V compound semiconductor.

Specific example of suitable semiconductor materials that may be used in (or as) the photocathode 12 include, but are not limited to, silicon (Si), gallium arsenide (GaAs), indium gallium arsenide (InGaAs), gallium antimonide (GaSb), mercury cadmium telluride (HgCdTe), and indium antimonide (InSb). It is also contemplated that semiconductor composites may be used in (or as) the photocathode 12.

At this point, those skilled in the art will appreciate that the type of semiconductor material selected for use in (or as) the photocathode 12, particularly the band gap of the selected semiconductor material, may dictate the portion of the electromagnetic spectrum to which the disclosed microplasma night vision device 10 may be sensitive.

Optionally, a first transparent substrate (not shown) may be layered over the outer surface 20 of the photocathode 12. For example, the first transparent substrate may be a layer of glass, polymer or the like, and may structurally reinforce the disclosed microplasma night vision device 10. A second transparent electrode (not shown) may optionally be positioned between the optional first transparent substrate and the photocathode 12 to enhance electrical conductivity proximate the photocathode 12. An objective lens (not shown) may optionally be included to collect and focus light onto the photocathode 12.

The transparent electrode 14 may be spaced a distance D from the photocathode 12, and may be generally parallel with the photocathode 12. The distance D may be dictated by, among other things, the size, composition and configuration of the plasma cavities 16 between the transparent electrode 14 and the photocathode 12.

The transparent electrode 14 may be generally electrically conductive. For example, the transparent electrode 14 may have an electrical conductivity of at least 100 S/cm, such as at least 1000 S/cm or at least 10,000 S/cm. Furthermore, the transparent electrode 14 may be generally optically transparent to the light being observed by the microplasma night vision device 10. For example, the transparent electrode 14 may have a transmittance of at least 50 percent, such as at least 75 percent or at least 90 percent.

In one particular construction, the transparent electrode 14 may be a thin-film, transparent conducting oxide. Several examples of transparent conducting oxides suitable for use as the transparent electrode 14 include, but are not limited to, indium tin oxide (ITO), aluminum-doped zinc oxide, and fluorine-doped tin oxide.

Optionally, a second transparent substrate (not shown) may be layered over the outer surface 22 of the transparent electrode 14. For example, the second transparent substrate may be a layer of glass, polymer or the like, and may structurally reinforce the disclosed microplasma night vision device 10.

The plasma cavities 16 may be arranged in parallel between the photocathode 12 and the transparent electrode 14. Therefore, each plasma cavity 16 may include a first end 24 electrically coupled to the photocathode 12 and a second end 26 electrically coupled to the transparent electrode 14.

In one particular implementation, the plasma cavities 16 may be arranged in an array having a plurality of rows and column. Each plasma cavity 16 of the array may correspond to a pixel (or sub-pixel) of an image. Therefore, the array of plasma cavities 16 may form an image upon plasma ignition.

Each plasma cavity 16 may house an ionizable gas. Examples of suitable ionizable gases include, but are not limited to, helium, neon, argon and other noble gases, and combinations thereof. Optionally, the ionizable gas may be in admixture with a carrier gas, such as nitrogen.

The voltage source 18 may apply a voltage V between the photocathode 12 and the transparent electrode 14. The applied voltage V may be less than, but proximate, the threshold voltage necessary to ionize the ionizable gas and ignite a plasma (e.g., a micro-plasma) within the plasma cavities 16. The threshold voltage may depend upon various factors, such as the size and shape of the plasma cavities 16 and the composition of the ionizable gas. For example, the applied voltage V may be at least 70 percent of the threshold voltage, such as at least 80 percent, at least 90 percent, or at least 95 percent.

Thus, when the microplasma night vision device 10 is exposed to electromagnetic energy above the band gap of the photocathode 12, the incident photons (arrow A) may excite electron-hole pairs within the photocathode 12. Upon separation of the electron-hole pairs, electrons may be directed into one or more of the plasma cavities 16, thereby igniting a transient plasma within the respective plasma cavities 16. The ignited plasma may persist so long as the flow of electrons persists, and may have a color and intensity. The ignited plasma may be viewed as visible light (arrow B) through the transparent electrode 14.

At this point, those skilled in the art will appreciate that the intensity of the plasmas formed within the plasma cavities 16 may depend on the number of electrons injected into the respective plasma cavities 16, which may be a function of the number of incoming photons (arrow A). The intensity of the plasmas formed within the plasma cavities 16 may also depend on, among other things, the composition of the ionizable gas (which may also affect plasma color), the gas pressure, and the applied voltage V.

In one contemplated alternative implementation, the voltage V applied by the voltage source 18 may be at or above the threshold voltage necessary to ionize the ionizable gas within the plasma cavities 16. Therefore, incident photons (arrow A) may cause electron emission into the plasma cavities 16, which may in turn alter the intensity of the plasma that is viewable as visible light (arrow B) through the transparent electrode 14.

Figure 2:
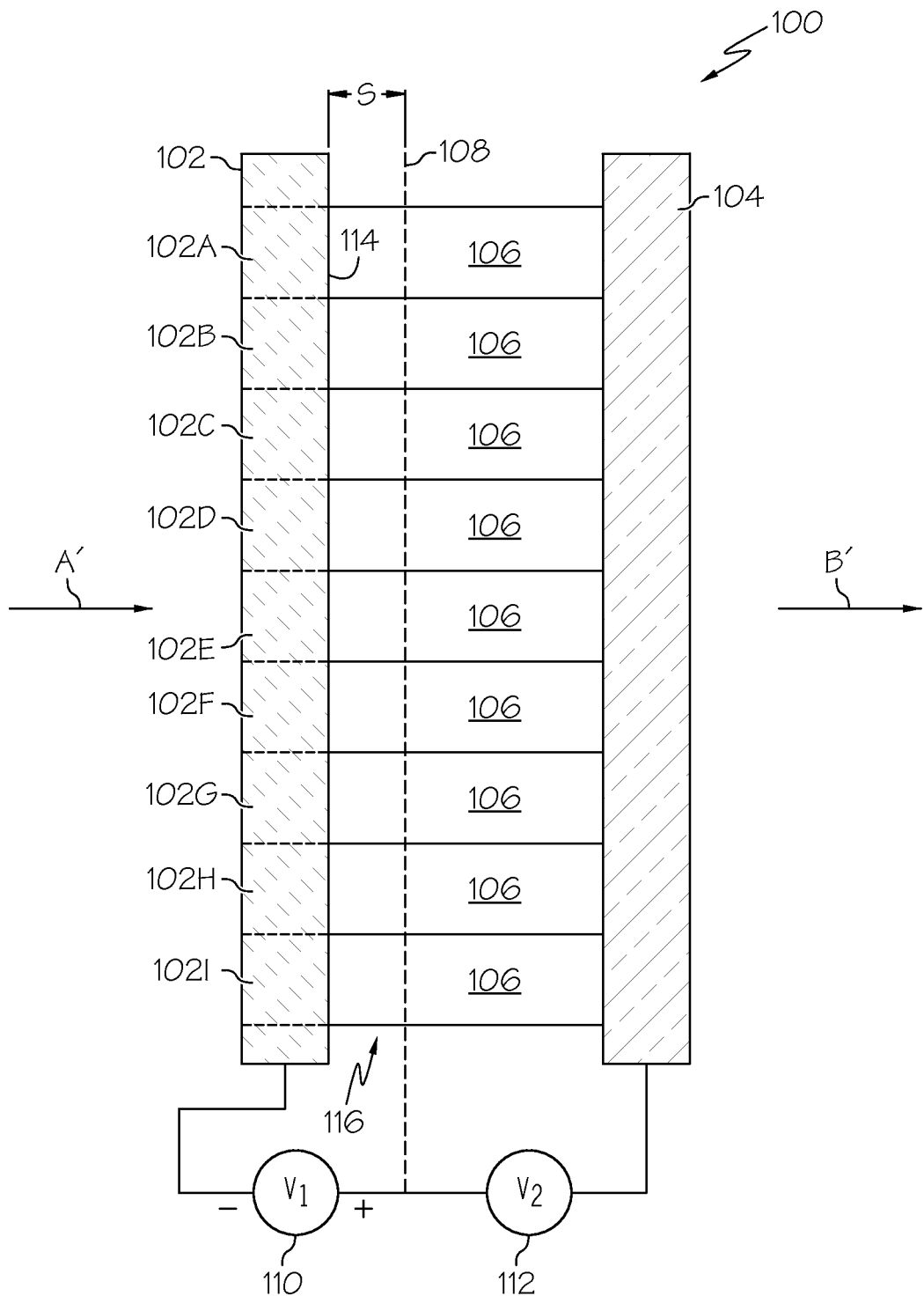
FIG. 2 is a schematic side elevational view, in section, of another embodiment of the disclosed microplasma night vision device.

Referring to FIG. 2, another embodiment of the disclosed microplasma night vision device, generally designated 100, may include a photocathode 102, a transparent electrode 104, a plurality of plasma cavities 106 and an accelerating grid 108. A first voltage source 110 may apply a first voltage $V_1$ between the photocathode 102 and the accelerating grid 108 and a second voltage source 112 may apply a second voltage $V_2$ between the accelerating grid 108 and the transparent electrode 104.

The photocathode 102, the transparent electrode 104 and the plasma cavities 106 of the microplasma night vision device 100 may be configured as described above in connection with the microplasma night vision device 10. Optionally, the photocathode 102 may be segmented into a plurality of photocathode segments 102A-102I. Each photocathode segment 102A-102I may be associated with a corresponding plasma cavity 106.

Thus, the microplasma night vision device 100 may be constructed and operated in substantially the same way as the microplasma night vision device 10 discussed above. However, as is described in greater detail below, the addition of the accelerating grid 108 may facilitate field emission of electrons from the photocathode 102.

The accelerating grid 108 may be positioned between the photocathode 102 and the transparent electrode 104, and may be spaced a distance S from the photocathode 102. The distance S between the photocathode 102 and the accelerating grid 108 may range from about 0 to about 50 percent of the distance D (FIG. 1) between the photocathode 102 and the transparent electrode, such as from about 5 to about 25 percent of the distance D.

The first voltage source 110 may apply a first voltage $V_1$ between the photocathode 102 (negative) and the accelerating grid 108 (positive). The first voltage $V_1$ may establish an electric field. Therefore, when the photocathode 102 is illuminated (arrow A'), the electric field may induce field emission of electrons from the inner surface 114 of the photocathode 102, and may accelerate the electrons into the plasma cavities 106.

The second voltage source 112 may apply a second voltage $V_2$ between the accelerating grid 108 and the transparent electrode 104. The second voltage $V_2$ may be less than, but proximate, the threshold voltage necessary to ionize the ionizable gas and ignite a plasma (e.g., a micro-plasma) within the plasma cavities 106. An AC voltage may optionally be used as the second voltage $V_2$ to inhibit erosion on the transparent electrode 104.

Thus, the field emitted electrons accelerated into the plasma cavities 106 may ignite plasmas within the plasma cavities 106, thereby emitting visible light (arrow B') through the transparent electrode 104. Optionally, the magnitude of the first voltage $V_1$ may be selected such that plasma ignition does not occur in the gap 116 between the photocathode 102 and the accelerating grid 108, but rather only occurs between the accelerating grid 108 and the transparent electrode 104.

Figure 3:
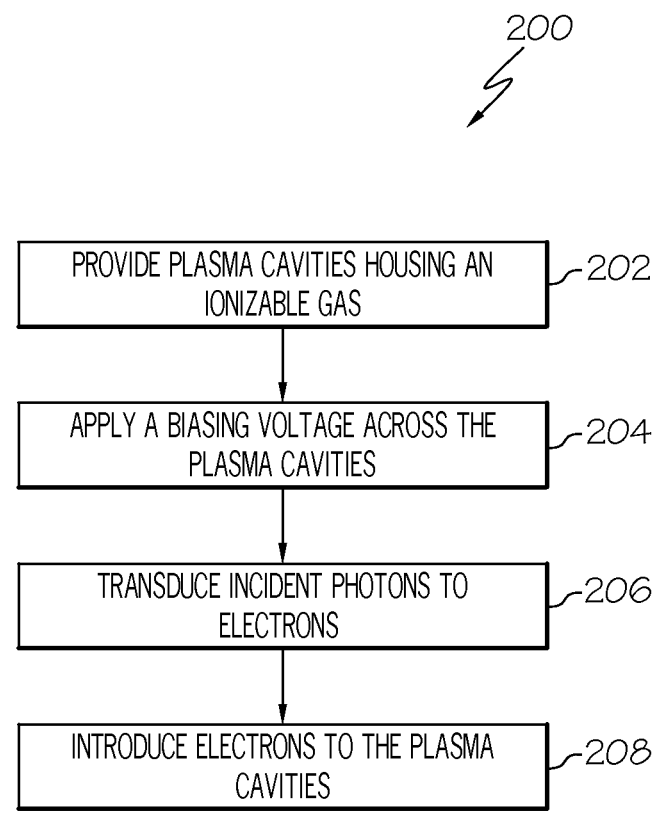
FIG. 3 is a flow chart depicting one embodiment of the disclosed method for amplifying incident photons.

Referring to FIG. 3, also disclosed is a method, generally designated 200, for sensing and amplifying incident photons. The method 200 may be used in a variety of applications, including but not limited to, night vision (visible and near infrared) and thermal imaging (infrared).

The method 200 may begin at Block 202 with the step of providing a plurality of plasma cavities. The plasma cavities may be arranged in parallel between a photocathode and a transparent electrode. Each plasma cavity may house an ionizable gas (or mixture of ionizable gases).

At Block 204, a voltage may be applied across the plasma cavities. The applied voltage may be less (e.g., just less) than the threshold voltage necessary to ionize the ionizable gas and ignite a plasma within the plasma cavities.

At Block 206, the incident photons may be transduced to electrons. The step of transducing the incident photons to electrons may be performed by a photocathode. An optional accelerating grid may effect field emission of the electrons from the photocathode.

At Block 208, the electrons may be introduced to the plasma cavities. Upon introducing the electrons to the plasma cavities, the electrical energy within the plasma cavities may be sufficient to ignite plasmas within the plasma cavities, thereby outputting visible light (i.e., output photons).

Thus, the disclosed method 200 employs a biasing voltage to generate micro-plasmas that output photons in response to incident photons, thereby effectively amplifying the incident photons.

Accordingly, the disclosed microplasma night vision devices and methods generate visible plasmas in response to incident photons and, therefore, function as significantly powerful photon amplifiers. By carefully selecting the photocathode material (e.g., using advanced semiconductor materials), as well as engineering device topology and plasma ignition parameters, it may be possible to achieve photon amplification ratios that are at least about 1 to 2 orders of magnitude higher than may be achieved using current night vision technology, such as Gen III night vision.

Although various embodiments of the disclosed microplasma night vision device and method have been shown and described, modifications may occur to those skilled in the art upon reading the specification. The present application includes such modifications and is limited only by the scope of the claims.

What is claimed is:

1. A photon sensing device comprising:
   a photocathode;
   a transparent electrode opposed from said photocathode;
   a plasma chamber positioned between said photocathode and said transparent electrode, said plasma chamber housing an ionizable gas; and
   an accelerating grid positioned between said photocathode and said transparent electrode.

2. The photon sensing device of claim 1 further comprising a voltage source, wherein said voltage source applies a voltage across said plasma chamber, said voltage being less than a threshold voltage required to ionize said ionizable gas.

3. The photon sensing device of claim 2 wherein said voltage is at least 90 percent of said threshold voltage.

4. The photon sensing device of claim 1 wherein said photocathode is sensitive to at least one of visible light and infrared light.

5. The photon sensing device of claim 1 wherein said photocathode comprised a semiconductor material.

6. The photon sensing device of claim 5 wherein said semiconducting material is selected from the group consisting of silicon, gallium arsenide, indium gallium arsenide, gallium antimonide, mercury cadmium telluride, indium antimonide, and combinations thereof.

7. The photon sensing device of claim 1 wherein said transparent electrode comprises a transparent conducting oxide.

8. The photon sensing device of claim 7 wherein said transparent conducting oxide is selected from the group consisting of indium tin oxide, aluminum-doped zinc oxide, fluorine-doped tin oxide, and combinations thereof.

9. The photon sensing device of claim 1 comprising a plurality of plasma chambers, wherein each plasma chamber of said plurality of plasma chambers houses said ionizable gas.

10. The photon sensing device of claim 1 wherein said ionizable gas comprises a noble gas.

11. The photon sensing device of claim 1 wherein a first voltage source applies a first voltage between said photocathode and said accelerating grid.

12. The photon sensing device of claim 11 wherein a second voltage source applies a second voltage between said accelerating grid and said transparent electrode.

13. Goggles comprising the photon sensing device of claim 1.

14. The goggles of claim 13 further comprising an objective lens.

15. A method for sensing incident photons comprising the steps of:
   providing a plasma cavity housing an ionizable gas;
   applying a voltage across said plasma cavity, said applied voltage being less than a threshold voltage required to ionize said ionizable gas;
   transducing said incident photons to electrons;
   introducing said electrons to said plasma cavity; and
   accelerating said electrons into said plasma cavity.

16. Goggles comprising:
   a photon sensing device comprising:
      a photocathode;
      a transparent electrode opposed from said photocathode; and a plasma chamber positioned between said photocathode and said transparent electrode, said plasma chamber housing an ionizable gas.

17. The goggles of claim 16 further comprising an objective lens.

18. The goggles of claim 17 wherein said objective lens is positioned to focus light onto said photocathode of said photon sensing device.

* * * * *